United States Patent [19]

Oetiker

[11] Patent Number: 5,283,931
[45] Date of Patent: Feb. 8, 1994

[54] REUSABLE EARLESS CLAMP STRUCTURE

[75] Inventor: Hans Oetiker, Horgen, Switzerland

[73] Assignee: Hans Oetiker AG Maschinen- und Apparatefabrik, Switzerland

[21] Appl. No.: 886,337

[22] Filed: May 20, 1992

[51] Int. Cl.⁵ .............................................. B65D 63/00
[52] U.S. Cl. ............................... 24/20 R; 24/20 CW; 24/20 TT
[58] Field of Search ............ 24/20 R, 20 CW, 20 TT, 24/20 S, 20 EE, 23 W, 23 EE, 484, 278, 279, 282; 285/39, 410

[56] References Cited

U.S. PATENT DOCUMENTS

| | | | |
|---|---|---|---|
| 79,340 | 6/1868 | Gillman | 24/282 |
| 2,689,141 | 9/1954 | Kiekhaefer | 24/279 |
| 4,492,004 | 1/1985 | Oetiker | 24/20 R |
| 4,711,001 | 12/1987 | Oetiker | 24/20 CW |
| 4,712,278 | 12/1987 | Oetiker | 24/20 TT |
| 4,987,651 | 1/1991 | Oetiker | 24/20 CW |
| 4,998,326 | 3/1991 | Oetiker | 24/20 R |
| 5,170,540 | 12/1992 | Oetiker | 24/279 |
| 5,191,684 | 3/1993 | Kenwright | 24/20 CW |

Primary Examiner—Victor N. Sakran
Attorney, Agent, or Firm—Paul M. Craig, Jr.

[57] ABSTRACT

An open reusable clamp structure, especially of the earless type, with a clamping band having overlapping inner and outer band portions adapted to be detachably interconnected by mechanical connecting means; first tool-engaging surfaces are provided in the inner and outer band portions, preferably in the form of pressed-out cold-deformed embossments for tightening the clamping band about an object to be fastened thereby, and second tool-engaging surfaces are provided in the inner and outer band portions which are separate from the first tool-engaging surfaces and are again preferably in the form of pressed-out cold-deformed embossments for reopening the previously interconnected overlapping band portions. To prevent over-torquing during reopening, undulations or the like are provided in the outer band portion intermediate the first and second tool-engaging surfaces.

39 Claims, 2 Drawing Sheets

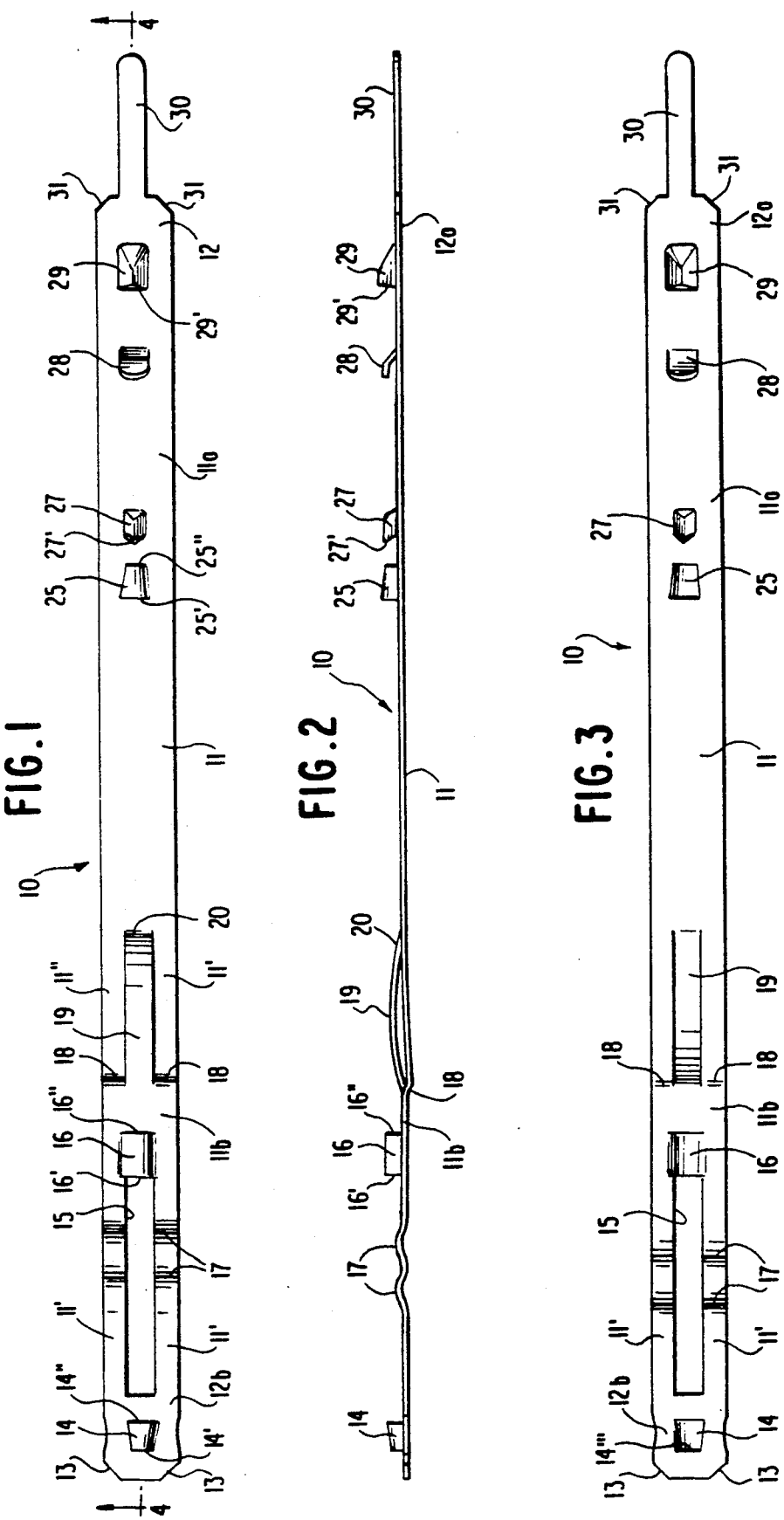

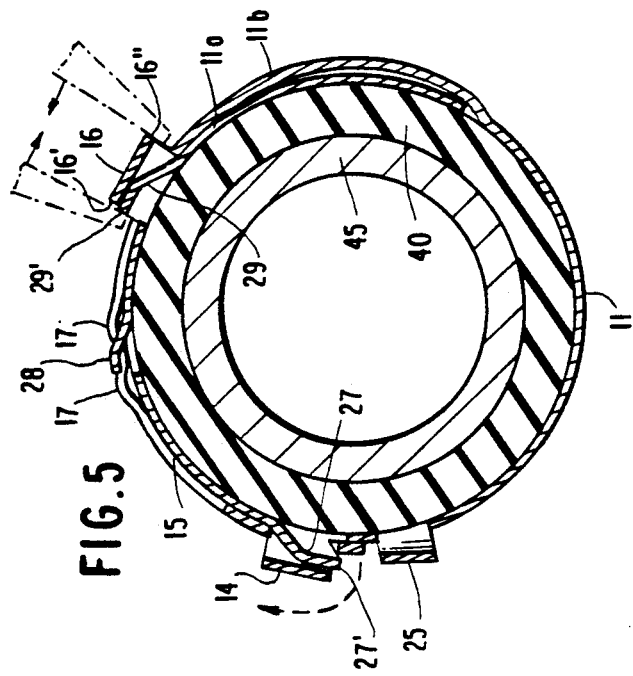
FIG.4
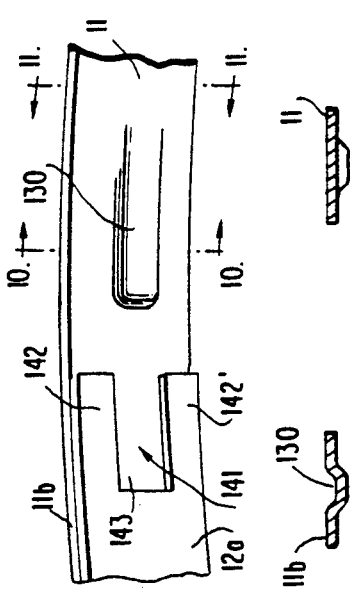
FIG.6
FIG.7
FIG.8
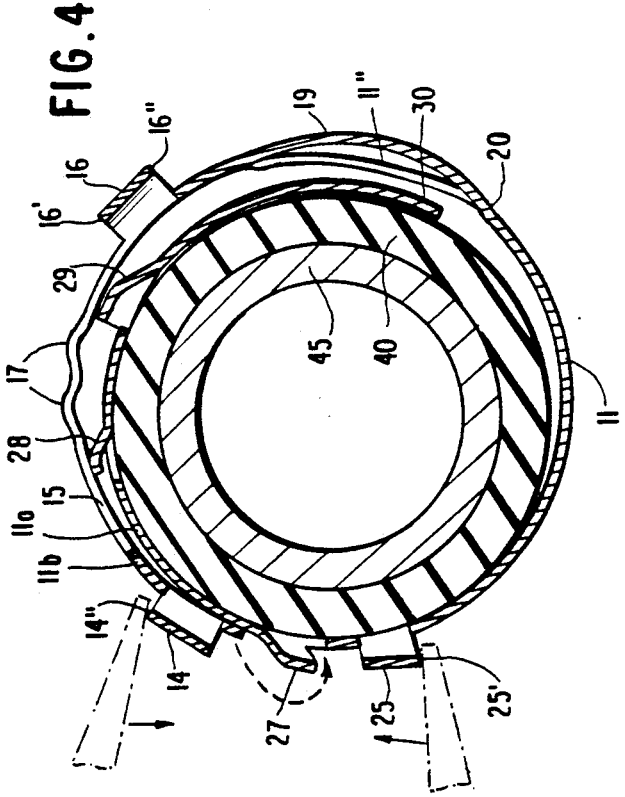
FIG.5
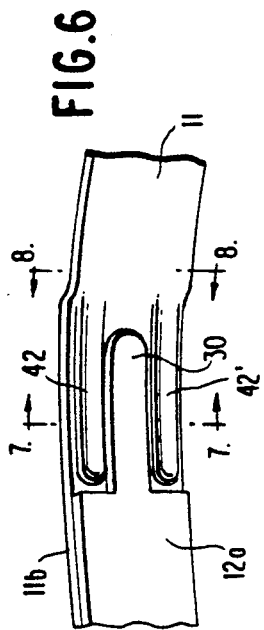
FIG.9
FIG.10
FIG.11

REUSABLE EARLESS CLAMP STRUCTURE

FIELD OF THE INVENTION

The present invention relates to an open reusable clamp of the so-called earless type.

BACKGROUND OF THE INVENTION

So-called earless clamp structures as disclosed in my prior U.S. Pat. No. 4,492,004, which are intended for low profile applications, have proved immensely successful. A modified earless clamp structure is disclosed in my prior U.S. Pat. No. 4,712,278, which entails certain advantages as described therein. As the earless clamp structures of the type described in my two aforementioned patents, contrary to clamps with so-called "Oetiker" ears, provide no elastic yielding to compensate for tolerances in the outside dimensions of the hoses, these earless clamp structures are designed to fit specified standard sizes of hoses so that the outwardly extending hook of the mechanical connection for the overlapping band portions engages in the opening of the outer band portion provided therefor when the clamp is tightened to assure predetermined tightness of the hose mounted over a nipple or the like. To provide some compensation for diametric tolerances of the hose, my prior U.S. Pat. No. 4,987,651, the subject matter of which is incorporated herein, proposed the incorporation into the band of one or more sections adapted to impart elastic stretchability in the longitudinal direction of the clamping band. In all of these prior art arrangements over-torquing not only during tightening but also especially during reopening of the earless clamp structures to release the mechanical connection and disassemble the clamp structure entailed the drawback of possible damage to the clamp structure, thereby jeopardizing its subsequent reuse.

SUMMARY OF THE INVENTION

The present invention is concerned with the task to avoid the aforementioned shortcomings and drawbacks in an open earless reusable clamp by extraordinarily simple means that lend .themselves to low-cost mass production and ease of installation and disassembly.

Another object of the present invention resides in an earless clamp structure of the type described above in which over-torquing is avoided during tightening as well as during reopening of the clamp structure.

A further object of the present invention resides in an earless reusable clamp structure which is capable of compensating automatically for changes in the diametric dimensions of the hose and at the same time minimizes the danger of over-torquing, especially during reopening of the hose.

Still another object of the present invention resides in an earless clamp structure of the type described above which is easy to handle both during installation and disassembly and which offers the possibility of a completely smooth internal clamping surface devoid of any steps or gaps.

The earless clamp structure in accordance with the present invention is characterized in that separate tool-engaging surfaces are provided in the inner and outer band portions for tightening and disassembling the clamp structure. The tool-engaging surfaces are thereby preferably formed by pressed-out portions in the inner and outer band portions which, to provide substantial resistance to high tightening and releasing forces in the circumferential direction, are integral with the clamping band at least along the longitudinal sides of these pressed-out embossments. Over-torquing during tightening of the clamp is effectively precluded, according to the present invention, by so locating the tool-engaging surfaces of the tunnel-shaped pressed-out embossments in the inner and outer band portions serving for tightening the clamp structure that the tool-engaging surface of the embossment in the inner band portion is about to reach an abutment surface in the pressed-out embossment of the outer band portion precluding further tightening of the clamp structure at the moment the outwardly extending hook of the mechanical connection in the inner band portion is about to engage in the opening provided therefor in the outer band portion.

According to another feature of the present invention, means, preferably in the form of undulations are provided in the outer band portion between the pressed-out embossment for tightening the clamp and the pressed-out embossment for releasing the clamp so that over-torquing is minimized during release of the clamp.

According to still another feature of the present invention, the pressed-out embossment for the release of the mechanical connection is located in the outer band portion nearer its free end than the pressed-out embossment serving for the tightening of the clamp. The outwardly extending hook of the mechanical connection which is preferably a pressed-out cold-deformed support hook, is so constructed and arranged that it will engage with the edge of the opening formed underneath the pressed-out clamp-releasing embossment in the outer band portion . which is located nearer the free end of the outer band portion. This permits an economic manufacture of the earless clamp structure blank which is user-friendly both for installation and disassembly. Furthermore, the undulations imparting elastic stretchability to the clamping band in the longitudinal direction can serve both for compensating external diametric changes due to temperature fluctuations of the installed hose as also for minimizing over-torquing during reopening of the clamp.

According to another feature of the present invention, means are provided in the inner and outer band portions to assure a completely smooth internal clamping surface devoid of steps or gaps whereby these means are so located that the undulations are covered by the underlying full band width of the inner ban portion.

According to still another feature of the present invention, the overlapping band portions are guided during relative movements of the inner and outer band portions. by a guide hook in the inner band portion adapted to engage in an elongated opening provided between the two pressed-out embossments in the outer band portion. In a particularly spacesaving manner, the undulations imparting elastic stretchability are provided in the lateral band portions remaining on both sides of the opening so that these undulations become effective during reopening of the clamp already in the presence of relatively smaller longitudinally directed forces than would be necessary if the undulations extended over the full band width. However, by providing the undulations with reinforcing grooves of any known type, for example, of the type used in the bridging portion of so-called "Oetiker" ears, the undulations can also be made stiffer, notwithstanding their narrower width determined by the width of the lateral band portions remaining on both sides of the longitudinal opening. The guide hook which is arranged in the inner band portion intermediate the pressed-out clamp-tightening embossment and the support hook of the mechanical interconnection in conjunction with the structure of the longitudinal opening and undulations provides a clamp structure which can be readily installed and disassembled with the use of standard tools such as pincer-like or long-nosed pliers.

Tightening is thus possible with clamp structures according to this invention without any difficulties also in the presence of a relatively large resistance to the required tightening torque.

The use of undulations in a clamping band to impart some elastic stretchability is known as such in the prior art, such as, for example, in EPO 458,701 A and DE-AS 10 91 821. The U.S. Pat. No. 1,705,895 to Blair also shows a clamping band with zig-zag cut-outs for the same purpose. However, differing from these prior art arrangements, the use of the undulations and their location in relation to the tightening embossments and separate release embossments not only is able to compensate for changes in the external dimensions of the hose but also is effective to minimize over-torquing during release of the mechanical connection when disassembling the installed clamp structure.

BRIEF DESCRIPTION OF THE DRAWINGS

These and other objects, features and advantages of the present invention will become more apparent from the following description when taken in connection with the accompanying drawing, which shows, for purposes of illustration only, one embodiment in accordance with the present invention, and wherein:

FIG. 1 is a top plan view on an earless reusable clamp structure in accordance with the present invention;

FIG. 2 is a side view of FIG. 1;

FIG. 3 is a bottom plan view on the clamp structure of FIG. 1;

FIG. 4 is a center cross-sectional view, taken along line 4—4 of FIG. 1 and illustrating the clamp structure in accordance with the present invention in the installed, but not yet tightened condition;

FIG. 5 cross-sectional view, similar to FIG. 4, but illustrating the parts in the installed, tightened condition;

FIG. 6 is a partial perspective view of a clamp structure in accordance with the present invention with a modified arrangement to avoid a step at the free end of the inner band portion;

FIG. 7 is a cross-sectional view taken along line 7—7 of FIG. 6;

FIG. 8 is a cross-sectional view taken along line 8—8 of FIG. 6;

FIG. 9 is a partial perspective view of a clamp structure in accordance with the present invention with a reversal of the parts of the modified arrangement of FIG. 6 to avoid a step at the free end of the inner band portion;

FIG. 10 is a cross-sectional view taken along line 10—10 of FIG. 9; and

FIG. 11 a cross-sectional view taken along line 11—11 of FIG. 9.

DETAILED DESCRIPTION OF THE DRAWINGS

Referring now to the drawing wherein like reference numerals are used throughout the various views to designate like parts, the reusable earless clamp structure generally designated by reference numeral 10 includes a clamping band 11 with overlapping inner and outer band portions 11a and 11b adapted to be mechanically interconnected by a mechanical connection to be described hereinafter. The outer band end portion 12b is provided with bevelled ends 13 and with a pressed-out tool-engaging embossment 14 for releasing the mechanical connection and preferably formed by cold deformation subsequent to two transverse cuts. As viewed in cross section transverse to the longitudinal direction of the clamping band, the embossment 14 is at least approximately semi-circularly shaped and has a tunnellike configuration which, for purposes of resistance to longitudinally directed forces, is integral with the clamping band along the sides thereof. Of the two thus-formed end surfaces 14' and 14", the end surface 14" constitutes a tool-engaging surface for the application of disassembly forces as will be described more fully hereinafter. Another pressed-out embossment 16 in the outer band portion 11b, preferably again formed by cold deformation subsequent to two transverse cuts, is also of at least approximately semi-circular shape as viewed in cross section transverse to the longitudinal direction of the clamping band. The embossment 16 is again integral along the sides thereof with the clamping band so as to provide substantial resistance to longitudinally directed tightening forces by the tunnel-like configuration formed thereby. Of the thus-formed end surfaces 16' and 16" of the pressed-out embossment 16, the end surface 16" constitutes a tool-engaging surface for the application of tightening forces by a tightening tool. Whereas the embossment 16 has parallel sides, the embossment 14 may have slightly tapering sides as shown in FIG. 1 in order to improve cooperation with the outwardly extending support hook 27 of the mechanical connection as will be explained more fully hereinafter. An elongated longitudinally extending opening 15 is provided intermediate the embossment 14 and the embossment 16 which commences directly adjacent the embossment 16 so a to communicate with the opening underneath the embossment 16 and terminates spaced from the embossment 14. The remaining lateral band portions 11' on both sides of the opening 15 are provided with means for imparting elastic stretchability to the clamping band in the longitudinal direction, preferably in the form of one or more undulations 17. If so desired, these undulations may be provided with reinforcing grooves similar, for example, to known prior art reinforcing grooves in the bridging portion of a typical "Oetiker" ear as shown, for instance, in U.S. Pat. No. 3,475,793 or in British Patent 2,160,577. However, it is also understood that in lieu of the preferred undulations 17, any other means for imparting elastic stretchability to the clamping band, such as disclosed in the aforementioned patents, may be used.

Continuing in a direction away from the free end of the outer band end portion 12b, a pressed-out tongue-receiving channel 19 is formed in the central area of the clamping band which commences at a first step-like portion 18 and terminates in a second step-like portion 20 whereby the pressed-out central tongue-receiving channel 19 is separated from the remaining lateral band portions 11" by one or several longitudinally extending cuts, as more fully described in my prior U.S. Pat. No. 4,299,012. The inner band end portion 12a is provided with a tongue-like extension 30 for engagement in the tongue-receiving channel 19 to provide an internal clamping surface devoid of any gaps or steps as described in the last-mentioned patent. The inner band end portion 12a is thereby connected with the tonguelike extension 30 by way of bevelled surfaces 31. For tightening the clamp structure in cooperation with pressed-out embossment 16, a pressed-out cold-deformed embossment 29 is provided in the inner band end portion 12a which is preferably formed by cold deformation subsequent to a single transverse cut so as to be integral with the clamping band over the remaining contour. The pressed-out embossment 29 is thereby again of at least approximately semi-circular shape in cross section transverse to the clamping band and forms with its end surface 29' a tool-engaging surface for the application of tightening forces by a tool. A pressed-out guide hook 28, which is formed by an approximately U-shaped cut that extends to the transverse bending axis about which the guide hook 28 is bent out, follows the embossment 29 at a predetermined spacing from the latter. This cut may be of any appropriate shape such as of U-shape or part-circular-shape, and the hook need not be rectilinear but may also be bent as shown in the drawing. Spaced from the guide hook 28 in the direction opposite from the free end of the inner band end portion 12a is next a pressed-out, cold-deformed support hook 27 which includes a nose portion 27' pointing away from the free end of the inner band portion for engagement with the edge 14''' (FIG. 3) in the opening underneath the embossment 14, which is located nearer the free end of the outer band end portion 12b. This edge 14''' is formed by the transverse cut and subsequent cold-deformation of the embossment 14 in the outer band end portion 12b. The cold-deformed support hook 27 may be of the type as disclosed, for example, in FIGS. 9 and 10 of my prior U.S. Pat. No. 4,492,004. Another pressed-out embossment 25 for releasing the clamp structure in cooperation with the pressedout embossment 14 is again preferably formed by cold deformation subsequent to two transverse cuts and is also of at least approximately semi-circular shape in a cross section transverse to the longitudinal direction of the clamping band so as to be integral along both sides with the clamping band to increase its resistance to longitudinally directed releasing forces. The sides of the embossment 25 are thereby tapering in the direction toward the free inner band end portion 12a. Within the area of the first pressed-out embossment 14, the sides of the outer band end portion 12b are thereby slightly concavely bent which results from the cold-deformation of the pressed-out embossment 14.

The clamping band according to the present invention, going from the outer clamping band end portion 12b in the direction toward the inner clamping band end portion 12a thus includes the following parts. A pressed-out tool-engaging clampreleasing embossment 14 for releasing the clamp is followed by an elongated opening 15 with the remaining lateral band parts 11' thereof provided with one or more undulations 17. Directly adjacent to the end of the opening 15 opposite the free end of the outer band end portion 12b is another pressed-out tool-engaging clamp-tightening embossment 16 for tightening the clamp which is followed at a certain distance by the tongue-receiving channel 19 starting at a first step-like portion 18 and terminating in a second step-like portion 20. Next follows the pressed-out tool-engaging clamp-releasing embossment 25 for releasing the clamp which is followed by the support hook 27 and then by the guide hook 28 that, in turn, is then followed by the pressed-out tool-engaging clamp-tightening embossment 2 for tightening the clamp. A tongue-like extension 30 terminates the inner band end portion 12a. The pressed-out tool-engaging embossments 16 and 29 which with their tool-engaging abutment surfaces 16'' and 29' constitute the means for tightening the clamp structure, are thereby of complementary transverse cross-sectional configuration so that the tool-engaging embossment 29 can slide underneath the tool-engaging embossment 16 as the clamp is tightened, whereby the width of the second embossment 29 is smaller than the width of the opening 15 to permit the tool-engaging embossment 29 to extend through the opening 15. The tool-engaging pressed-out embossments 14 and 25 constitute with their tool-engaging surfaces 14'' and 25' the release means to reopen the clamp. The support hook 27 in conjunction with the edge 14''' formed by the opening underneath the embossment 14 constitute the mechanical connection whereby the projecting nose portion 27' is adapted to slide over the outer surface of the outer band end portion 12b to latch the overlapping band portions in the installed condition. The guide hook 28 in cooperation with the opening 15 constitutes the guide means to guide the inner and outer band portions axially during relative movement of the two band portions in the circumferential direction.

OPERATION

To tighten the preformed clamp structure placed about a hose 40 mounted over a nipple 45, it is only necessary to press the opposite jaws of a standard tool such as a pincer-like tool or flat-nosed pliers against the tool-engaging surfaces 16'' and 29' of the clamp-tightening embossments 16 and 29 until the support hook 27 reaches the opening underneath the first embossment 14 and extends with its nose portion into the opening. The clamp is thereby so designed that with the support hook 27 engaging at the edge 14''', the clamp is in the fully tightened and installed position for a hose of predetermined standard dimensions. The undulations 17 provide a certain amount of compensation for any changes in the outside dimensions of the hose 40 and therewith of the installed clamp structure. If it is now desired to reopen the clamp structure, i.e., disassemble the same for subsequent reuse, it is only necessary to apply a reopening force to the tool-engaging surfaces 14'' and 25' of the clamp-releasing embossments 14 and 25 by a similar tool as used for tightening until the nose portion 27' of the support hook 27 can clear the edge 14'''. The undulations 17 thereby minimize the danger of over-torquing by the circumferentially directed release force applied at the pressed-out clamp-releasing embossments 14 and 25. Thus, the undulations 17 according to the present invention perform a dual function, i.e., provide some compensation for changes in the outside dimensions of the installed clamp structure and, by reason of the separate tightening and release means formed by embossments 16, 29 and 14, 25 and their particular location, also preclude over-torquing during the disassembly of the clamp structure. Because of the particular construction of the clamp structure according to this invention, the same tool can be used both for installing and disassembling the clamp. Of course, other tools, such as disclosed in my prior U.S. Pat. Nos. 4,708,034; 4,724,729 and 4,754,668 may be used with the clamps of this invention.

Over-torquing during tightening of the clamp is avoided by the particular location of the clamp-tightening embossments 16 and 29 in the clamping band and their complementary cross-sectional configurations such that the tool-engaging surface 29' is almost flush with the abutment surface 16' of the tool-engaging embossment 16 as the embossment 29 slides underneath the embossment 16 during tightening and the support hook 27 is about to engage with the edge 14''' so that further tightening of the clamp structure becomes impossible by abutment of the jaw of the tightening tool, which is in engagement with the tool-engaging surfaces 29' and now also abuts at the abutment surface 16'.

The present invention offers a number of distinct advantages. It is very space-saving because it can be built to assure a low profile. No special tools are necessary for tightening and reopening the clamp. Because of the cold-deformed pressed-out embossments, large tightening forces and again large reopening forces can be applied. The earless clamp in accordance with the present invention can be reused a number of times and is particularly user-friendly and comfortable to install and release because the tightening and disassembly means are completely separate from one another. The tunnel-like construction which is used in the clamp structure according to the present invention and which may be similar to my prior U.S. Pat. No. 4,492,004 further enhances these features. Additionally, the clamp is extraordinarily simple, easy to manufacture and utilizes the means for imparting elastic stretchability to compensate both for changes in the outside dimensions of the installed clamp as well as to minimize the danger of over-torquing during the application of the release forces.

The various pressed-out embossments as well as the hooks which have been shown herein in a preferred embodiment, may also be modified as known to those skilled in the art. For example, to achieve an internal clamping surface devoid of gaps and steps, the central tongue-receiving channel 19 may be replaced by an opening commencing in the area of the step-like portions 18, as more fully disclosed in my prior U.S. Pat. No. 4,315,348. Additionally, while the tongue-like extension 30 in conjunction with the tongue-receiving channel 19 represents a preferred embodiment for achieving an internal clamping surface devoid of any steps or gaps, the presence of a step formed by the free end of the inner band portion can also be avoided by the adoption of the teachings of my prior U.S. Pat. No. 4,237,584 which suggests in FIGS. 1-6 the use of a fork-shaped configuration at one band end to receive an extension of complementary shape at the other band end. In the application of these teachings to a clamp structure made in one piece, this last-mentioned patent suggests in FIGS. 7-10 that the fork-shaped configuration be formed at an appropriate place in the overlapping outer band portion by the provision of two inwardly pressed-out, transversely spaced projections accommodating in the space formed therebetween the extension at the inner band portion. The application of these teachings to the clamp structure of the present invention is illustrated in FIGS. 6-8 of this application in which the extension 30 at the inner band end portion 12a is adapted to extend into the fork-shaped configuration generally designated by reference numeral 41 and formed by two inwardly pressed-out cold-deformed projections 42 and 42' in the overlapping outer band portion 11b, whereby the pressed-out projections 42 and 42' gradually merge again into the full band width of the outer band portion in such a way that the maximum length of the extension 30 can be accommodated. FIGS. 9-11 illustrate the mere reversal of the parts of FIGS. 6-8 in that the inner band end portion 12a is now provided with an open fork-shaped configuration generally designated by reference numeral 141 formed by two fork tines 142, 142' to receive in the channel 143 formed therebetween the inwardly pressed-out projection 130 which is pressed out by cold deformation from an appropriate central area of the overlapping band portion 11b whereby the tongue-like projection 130 again gradually merges into the full band width of the outer band portion. The dimensions of the pressed-out projections 42, 42' and 130 are so chosen that they correspond at least approximately to the thickness of the clamping band and are complementary to the width of the tongue-like extension 30, respectively, the channel 143, while the location of the parts in FIGS. 6 and 9 is thereby such that the undulations 17 are again covered by the full band width of the inner band portion 11a.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An open reusable clamp structure, especially of the earless type, comprising clamping band means having overlapping inner and outer band portions adapted to be detachably interconnected by mechanical connecting means, first tool-engaging means in the inner and outer band portions for tightening the clamping band means about an object to be fastened thereby by the application of tightening forces corresponding substantially to the installed condition of the clamp structure, and second tool-engaging means in said inner and outer band portions separate from said first tool-engaging means for disassembling the clamp structure from its previously installed condition by reopening the overlapping band portions previously interconnected by the application of the tightening forces.

2. An open reusable clamp structure according to claim 1, wherein said first tool-engaging means includes further means for preventing over-torquing during tightening of the clamp structure.

3. An open reusable clamp structure according to claim 1, wherein said outer band portion is provided with a longitudinal opening intermediate the first and second embossment means in the outer band portion, and wherein said inner band portion is provided with a guide hook for engagement in said opening to guide the inner and outer band portions axially relative to one another during tightening of the clamp structure.

4. An open reusable clamp structure according to claim 3, wherein said guide hook is located in the inner band portion intermediate the first and second embossment means thereof.

5. An open reusable clamp structure according to claim 3, wherein said additional means are formed by undulation means in the lateral band portions adjacent said opening.

6. An open reusable clamp structure according to claim 1, further comprising means to provide an internal clamping surface devoid of any gaps or steps including tongue-like means in one band portion and tongue-receiving means in the other band portion.

7. An open reusable clamp structure according to claim 6, wherein one of said tongue-like means and tongue-receiving means is formed by cold-deformed embossment means pressed out of the overlapping band portion in the inward direction.

8. An open reusable clamp structure according to claim 7, wherein said embossment means forms the tongue-receiving means by two spaced inwardly pressed-out embossment means defining therebetween a tongue-receiving channel for the tongue-like means at the inner band portion.

9. An open reusable clamp structure according to claim 7, wherein said embossment means forms the tongue-like means adapted to engage in a fork-shaped configuration at the inner band end.

10. An open reusable clamp structure according to claim 6, wherein said tongue-receiving means starts within the area of a first step-like portion in said outer band portion and extends in a direction away from the free end of the outer band portion.

11. An open reusable clamp structure according to claim 10, wherein said tongue-receiving means includes a central channel starting at said first step-like portion and terminating in a second step-like portion.

12. An open reusable clamp structure according to claim 1, wherein said clamp structure, starting from the free end of the outer band portion, includes the second embossment means in the outer band portion, the longitudinal opening and the additional means, the first embossment means in the outer band portion, the second embossment means in the inner band portion, the support hook means, the guide hook, the first embossment means in the inner band portion and the tongue-like means.

13. An open reusable clamp structure, especially of the earless type, comprising clamping band means having overlapping inner and outer band portions adapted to be detachably interconnected by mechanical connecting means, first tool-engaging means in the inner and outer band portions for tightening the clamping band means about an object to be fastened thereby, second tool-engaging means in said inner and outer band portions separate from said first tool-engaging means for reopening the previously interconnected overlapping band portions, and additional means located within an area in said outer band portion intermediate the first and second tool-engaging means for imparting to said area of the clamping band means elastic stretchability in the longitudinal direction.

14. An open reusable clamp structure according to claim 13, wherein said first tool-engaging means include a first pressed-out embossment means in the outer band portion and a first pressed-out embossment means in the inner band portion.

15. An open reusable clamp structure according to claim 14, wherein said first embossment means in said outer and inner band portions are of at least approximately complementary shape as viewed in transverse cross section through the clamping band means so that the first embossment means in the inner band portion can slide underneath the first embossment means in the outer band portion in nested relationship therewith during tightening of the clamp structure.

16. An open reusable clamp structure according to claim 15, wherein said first embossment means in said outer and inner band portions are approximately semi-circularly shaped in said transverse cross section and extend in the longitudinal direction of the clamping band means with at least the sides thereof integral with the clamping band means.

17. An open reusable clamp structure according to claim 16, wherein each said of said first embossment means is delimited at least at one end thereof by a substantially transverse cut forming a tool-engaging surface.

18. An open reusable clamp structure according to claim 14, wherein said second tool-engaging means includes a second pressed-out embossment means in the outer band portion and a second pressed-out embossment means in said inner band portion.

19. An open reusable clamp structure according to claim 18, wherein said second embossment means in said outer and inner band portions are approximately semi-circularly shaped as viewed in transverse cross section through the clamping band means with a tool-engaging surface at one end of each of the second embossment means.

20. An open reusable clamp structure according to claim 19, wherein each tool-engaging surface of the second embossment means is formed by a substantially transverse cut.

21. An open reusable clamp structure according to claim 20, wherein said second embossment means are integral with the clamping band means over at least the sides thereof.

22. An open reusable clamp structure according to claim 19, wherein said first embossment means in said outer and inner band portions are of at least approximately complementary shape as viewed in transverse cross section through the clamping band means so that the first embossment means in the inner band portion can slide underneath the first embossment means in the outer band portion in nested relationship therewith during tightening of the clamp structure.

23. An open reusable clamp structure according to claim 22, wherein said first embossment means in said outer and inner band portions are approximately semi-circularly shaped in said transverse cross section and extend in the longitudinal direction of the clamping band means with at least the sides thereof integral with the clamping band means.

24. An open reusable clamp structure according to claim 23, wherein each said of said first embossment means is delimited at least at one end thereof by a substantially transverse cut forming a tool-engaging surface.

25. An open reusable clamp structure according to claim 13, wherein said first tool-engaging means includes further means for preventing over-torquing during tightening of the clamp structure.

26. An open reusable clamp structure according to claim 25, wherein said first tool-engaging means include a first pressed-out embossment means in the outer band portion and a first pressed-out embossment means in the inner band portion.

27. An open reusable clamp structure according to claim 26, wherein said second tool-engaging means includes a second pressed-out embossment means in the outer band portion and a second pressed-out embossment means in said inner band portion.

28. An open reusable clamp structure according to claim 27, wherein said outer band portion is provided with a longitudinal opening intermediate the first and second embossment means in the outer band portion, and wherein said inner band portion is provided with a guide hook for engagement in said opening to guide the inner and outer band portions axially relative to one another during tightening of the clamp structure.

29. An open reusable clamp structure according to claim 28, wherein said additional means are formed by undulation means in the lateral band portions adjacent said opening.

30. An open reusable clamp structure according to claim 29, wherein said connecting means includes a pressed-out support hook means located intermediate said guide hook and said second embossment means in the inner band portion, said support hook means having a latching portion projecting out of the inner band portion and extending in a direction away from the free end of the inner band portion, and said latching portion being of such shape as to engage with a transverse edge in the opening formed by the first embossment means in the outer band portion, and said edge being located nearer the free end of the outer band portion.

31. An open reusable clamp structure according to claim 30, wherein said connecting means are so located in the clamping band means as to interconnect the overlapping band portions when the clamp structure of predetermined size is correctly tightened about the object to be fastened thereby, and wherein said further means is effectively formed by the location of the first embossment means in said inner and outer band portions such that the tool-engaging surface in the first embossment means in the inner band portion is about to be flush with the end surface of the first embossment means in the outer band portion opposite the tool-engaging surface thereof when the clamp has reached its tightening position in which said connecting means becomes effective.

32. An open reusable clamp structure according to claim 31, further comprising means to provide an internal clamping surface devoid of any gaps or steps including tongue-like means in one band portion and tongue-receiving means in the other band portion.

33. An open reusable clamp structure according to claim 32, wherein said tongue-receiving means starts within the area of a first step-like portion in said outer band portion and extends in a direction away from the free end of the outer band portion.

34. An open reusable clamp structure according to claim 33, wherein said clamp structure, starting from the free end of the outer band portion, includes the second embossment means in the outer band portion, the longitudinal opening and the additional means, the first embossment means in the outer band portion, the first step-like portion adjoined by the tongue-receiving means, the second embossment means in the inner band portion, the support hook means, the guide hook, the first embossment means in the inner band portion and the tongue-like means.

35. An open reusable clamp structure, especially of the earless type, comprising clamping band means having overlapping inner and outer band portions adapted to be detachably interconnected by mechanical connecting means, first tool-engaging means in the inner and outer band portions for tightening the clamping band means about an object to be fastened thereby, and second tool-engaging means in said inner and outer band portions separate from said first tool-engaging means for reopening the previously interconnected overlapping band portions, said connecting means including a pressed-out support hook means located intermediate said guide hook and said second tool-engaging means in the inner band portion, said support hook means having a latching portion projecting out of the inner band portion and extending in a direction away from the free end of the inner band portion, and said latching portion being of such shape as to engage with a transverse edge in the opening formed by the first tool-engaging means in the outer band portion.

36. An open reusable clamp structure, especially of the earless type, comprising clamping band means having overlapping inner and outer band portions adapted to be detachably interconnected by mechanical connecting means, first tool-engaging means in the inner and outer band portions for tightening the clamping band means about an object to be fastened thereby, and second tool-engaging means in said inner and outer band portions separate from said first tool-engaging means for reopening the previously interconnected overlapping band portions, said first tool-engaging means including further means for preventing over-torquing during tightening of the clamp structure, said connecting means being so located in the clamping band means as to interconnect the overlapping band portions when the clamp structure of predetermined size is correctly tightened about the object to be fastened thereby, and said further means being effectively formed by the location of the first tool-engaging means in said inner and outer band portions such that the tool-engaging surface in the first tool-engaging means in the inner band portion is about to be flush with the end surface of the first tool-engaging means in the outer band portion opposite the tool-engaging surface thereof when the clamp has reached its tightening position in which said connecting means becomes effective.

37. An open reusable clamp structure, especially of the earless type for securing an underlying object to be fastened thereby, comprising clamping band means having overlapping inner and outer band portions adapted to be detachably interconnected by mechanical connecting means, first tool-engaging means in the inner and outer band portions to enable tightening the clamping band means about the object to be fastened thereby until the clamp structure substantially reaches its installed condition, second tool-engaging means in said inner and outer band portions separate from said first tool-engaging means to enable disassembly of the clamp structure from its installed condition by causing the previously interconnected overlapping band portions to disconnect, and additional means substantially preventing over-torquing of the clamping band means during disassembly of the clamp structure.

38. An open reusable clamp structure according to claim 37, wherein said additional means includes means for imparting to the clamping band means elastic stretchability in its longitudinal direction.

39. An open reusable clamp structure according to claim 38, wherein said first tool-engaging means includes further means for preventing over-torquing during tightening of the clamp structure.

* * * * *